UNITED STATES PATENT OFFICE.

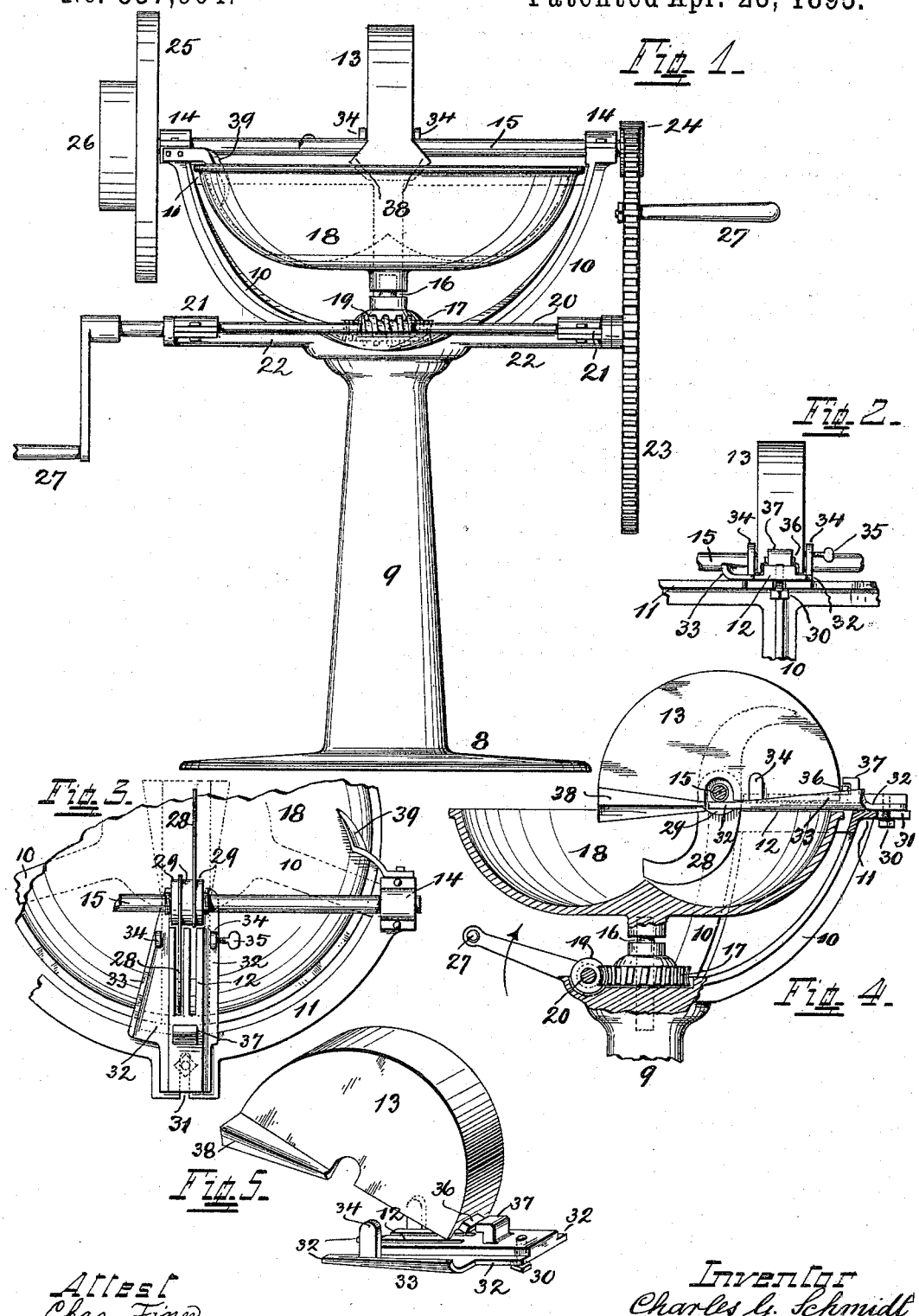

CHARLES G. SCHMIDT, OF CINCINNATI, OHIO.

MEAT-CHOPPER.

SPECIFICATION forming part of Letters Patent No. 537,904, dated April 23, 1895.

Application filed November 16, 1894. Serial No. 529,002. (No model.)

*To all whom it may concern:*

Be it known that I, CHARLES G. SCHMIDT, a citizen of the United States, and a resident of Cincinnati, Hamilton county, State of Ohio, have invented new and useful Improvements in Meat-Choppers; and I do declare the following to be a full, clear, and exact description of the invention, such as will enable others skilled in the art to which it appertains to make and use the same, attention being called to the accompanying drawings, with the reference-numerals marked thereon, which form a part of this specification.

This invention which is for improvements and changes over the one patented by me June 20, 1893, No. 499,755, relates to machines whereby meat is reduced by chopping to a consistency to make it suitable for use in ssausages and similar purposes. One of the most important requirements of such machines is simplicity and easy accessibility for the purpose of permitting the convenient handling of the meat and primarily to be enabled to keep all parts of these machines perfectly clean. For the purpose of satisfying these requirements, the parts, especially those which come more or less in direct contact with the meat, should be removable and this feature should be obtained by a construction which permits a ready removal as well as a quick re-adjustment of these parts. To them belong principally the knives, the comb, or stripper against which they cut and which keeps them clear of accumulating meat, and the hood which covers the knives. This latter which catches the meat thrown off by the knives and serves as a protective guard for the operator's hands, should be removably in the most convenient and ready manner, to give quick access to the knives for their observation while running in case such is required and for their cleaning after use. The removal and re-adjustment of the comb should be accomplished with equal facility. For such purpose I have devised a construction whereby the hood is kept in position principally by its own weight and it may be removed by a simple and quick motion without unscrewing any parts or undoing any adjustments, nor is any extra provision or space required for its support which is furnished by the comb. The removal of this latter is also readily accomplished without any complicated construction.

Other features of my invention relate to the general construction which has been greatly simplified in all parts, especially as regards the main-frame, which carries all the parts and which has been greatly improved with a view to obtain the necessary support and stability with the greatest permissible reduction of all unnecessary spread and bulk, whereby a pleasing outline and appearance, as well as a saving of floor-space are obtained.

In the following specification is found a full description of my invention, its operation, parts, and construction, the latter being also illustrated in the accompanying drawings, in which—

Figure 1 is a front-view of the machine complete. Fig. 2 is a partial rear-view of the upper part of the same. Fig. 3 is a partial top-view of the machine showing the hood removed. Fig. 4 is a sectional side-elevation of the upper part of the same. Fig. 5 by a perspective view, shows comb and hood detached from their positions and the latter partly raised off of the former.

The frame which supports all parts consists of a base 8, from which rises a column 9, which at its top spreads in several, preferably three brackets 10, which support a segmental top 11, on which rests the comb 12, with the hood 13, and the boxes 14, of the knife-shaft 15. In the center of the top of the column 9, is supported an upright shaft 16, to which a worm-wheel 17 is secured and which carries and supports at its upper end the rotating bowl 18. The motion of the latter proceeds from a worm 19, which meshes with worm-wheel 17 and is rotated by a shaft 20, to which it is secured and which latter revolves in boxes 21, supported on arms 22, also extending out from the top of column 9. From this shaft is also obtained the power to drive the knife-shaft by means of a gear-wheel 23, and pinion 24, on one end of the latter shaft. On its other end the knife-shaft carries a fly-wheel 25, and a driving pulley 26, to be used when this machine is driven by power. As hand-power is principally intented however, I provide cranks with handles 27, on each end of shaft 20, for operating the latter.

The knives 28, are of the shape customary in such machines and are secured in position by screw-threaded collars 29, adjusted in the proper place on shaft 15. Their outer ends pass close to the interior surface of the bowl, which by its rotation presents successively and repeatedly all the meat contained therein to the action of the knives.

The coarser parts of the meat which do not readily yield to separation by the knives, are carried up by them against the under-surface of the comb 12, where, unable to follow through the interstices of the latter, they are cut. This comb also keeps the knives clear and prevents any meat adhering and accumulating on them. It is provided with a set-screw 30, the shank of which passes within an open slot 31, in the rearwardly extended upper flange of top 11, and the head of which, when screwed home, impinges against the under side of said flange, whereby the comb is held in place on top 11. To prevent its lateral displacement and keep its interstices in alignment with the knives, to permit them free passage, this comb is provided with two flanges 32, one on each side, which extend beyond it and toward the knife-shaft, passing close by and coming against the outer ones of collars 29, the combined length of these latter, which they occupy on the knife-shaft, being such that they exactly fill the space between flanges 32. From this it follows that, inasmuch as said collars as to location are fixedly secured in position, this end of the comb will also be held in position and prevented from lateral displacement, so that between said collars and abutting flanges 32, and the set-screw 30, the comb is securely held in position. See Figs. 3 and 4. One of said flanges is laterally extended, its outer edge being radial to the center of the bowl and turned up to form a guiding lip 33, which readily leads the meat under the comb and prevents it from crowding up and over the same.

The hood 13, the object of which has been explained before, rests on and is held in position by the comb, respectively parts of it, it fitting snugly over the former. Its sides pass down to each side of the comb proper, being cut out to clear the knife-shaft, and rest with their lower edges on flanges 32. The comb being higher than these latter and reaching up into and between the sides of the hoods prevents lateral displacement of the same. See Fig. 2. Such lateral displacement may be further guarded against by two posts 34, rising from flanges 32, the distance between them being such as to permit the hood to occupy the space. One of them may have a setscrew 35, which by impinging sidewise against the hood, prevents any possibility of it being displaced vertically by being lifted off, should any such tendency exist, which latter is however practically overcome by its weight. Longitudinal displacement is prevented by the aforesaid cut-out portion of the sides, which fits over the knife shaft and by a flange 36, which fits under a hook-shaped lug 37, on the comb. The lower edges of that part of the hood which extend beyond the comb, are thrown out side wise and form shields 38, to protect the hands of the operator while manipulating the meat in the open part of the bowl.

39, is a plow-shaped scraper secured to one of the boxes of the knife-shaft and reaching down into the bowl close to its side, it turns the meat over and down and prevents it from crowding up over the edge of the bowl.

In this machine the greatest efficiency is obtained with the most simple construction and with a reduction to the lowest permissible minimum of parts and sizes, which gives in addition a pleasing appearance to the frame, saving floor-space by the reduction in bulk and producing an easy and noiseless operation of the machine, requiring no excessive power to run it.

Having described my invention, I claim as new—

1. In a meat-chopper, the combination of a rotating bowl and a rotating knife-shaft with knives passing through said bowl, collars 29 on the knife-shaft whereby the knives are held in position on said shaft, a frame to support the bowl, the arc-shaped top 11, carried by said frame, a comb 12, on top 11, provided with a set-screw 30, adapted to pass into slot 31, in top 11, flanges 32, on each side of comb 12, extending beyond its end and resting on each side against collars 29, whereby in conjunction with set-screw 30, the comb is held in position.

2. In a meat-chopper, the combination of a rotating bowl and a rotating knife-shaft with knives passing through said bowl, collars 29, on the knife-shaft, whereby the knives are held in position on said shaft, a frame to support the bowl, the arc-shaped top 11, carried by said frame, a comb 12, on top 11, and a hood 13, carried on and held in position by parts of said comb.

3. In a meat-chopper, the combination of a rotating bowl and a rotating knife-shaft with knives passing through said bowl, collars 29, on the knife-shaft whereby the knives are held in position on said shaft, a frame to support the bowl, the arc-shaped top 11, carried by said frame, a comb 12, on top 11, provided with a set-screw 30, adapted to pass into a slot 31, in top 11, flanges 32, on each side of comb 12, extending beyond its end and resting on each side against collars 29, whereby in conjunction with set-screw 30, the comb is held in position and a hood 13 supported on the latter and held in position by parts thereof.

4. In a meat-chopper, the combination of a rotating bowl and a rotating knife-shaft, means to support and operate these parts, a comb 12, supported above the bowl and extending over the top of the same, flanges 32, on each side of the comb and lower than it, a hood 13, being cut out to clear the knife-shaft and resting with its lower edges on said flanges, its sides passing over and close down on the sides of the comb which reaches up into and between the said sides of the hood, whereby lateral displacement of the latter is prevented, a flange 36 on it and a hook-shaped lug 37, on the comb, which two, by their engagement and in conjunction with the knife-shaft passing through the cut-out portions in the sides of the hood, prevent longitudinal displacement of the latter.

5. In a meat-chopper, the combination of a rotating bowl and a rotating knife-shaft, means to support and operate these parts, a comb 12, supported above the bowl and extending over the top of the same, flanges 32, on each side of the comb, which latter projects above them, a hood 13, being cut out to clear the knife-shaft and resting with its lower edges on said flanges, its sides passing over and close down on the sides of the comb, which reaches up, into and between the said sides of the hood, whereby lateral displacement of the latter is prevented, a flange 36, on it and a hook-shaped lug 37, on the comb, which two by their engagement and in conjunction with the knife-shaft, passing through the cut-out portion in the sides of the hood, prevent its longitudinal displacement and posts 34, to each side of the latter, rising from the comb and one provided with a set-screw 35, which by its impingement against the hood, prevents the same from being lifted off of the comb.

6. In a meat-chopper, the combination of a rotating bowl and a rotating knife-shaft, means to support and operate these parts, a comb 12, against which the knives cut and whereby they are kept free from accumulating meat and the radial upturned guide-lip 33, on said comb, whereby the meat carried around by the rotating bowl, is guided under the comb and prevented from crowding up on the same.

7. In a meat-chopper, the combination of a rotating bowl and a rotating knife-shaft, means to support and operate these parts, a comb 12, against which the knives cut whereby they are kept free from accumulating meat and a hood 13, which covers the knives above the bowl and is provided with the laterally extended shields 38, which serve as guards to protect the operator's hands while manipulating the meat in the bowl.

In testimony whereof I hereunto set my hand in presence of two witnesses.

CHARLES G. SCHMIDT.

Witnesses:
C. SPENGEL,
C. FINN.